US011027400B2

United States Patent
Raskin et al.

(10) Patent No.: US 11,027,400 B2
(45) Date of Patent: Jun. 8, 2021

(54) ELECTRICALLY ISOLATED COUPLING

(71) Applicant: Apex Brands, Inc., Apex, NC (US)

(72) Inventors: James Richard Raskin, Ellicott City, MD (US); Matthew Paul Keller, Reisterstown, MD (US)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 16/607,133

(22) PCT Filed: May 2, 2018

(86) PCT No.: PCT/US2018/030603
§ 371 (c)(1),
(2) Date: Oct. 22, 2019

(87) PCT Pub. No.: WO2018/204468
PCT Pub. Date: Nov. 8, 2018

(65) Prior Publication Data
US 2020/0376635 A1  Dec. 3, 2020

Related U.S. Application Data

(60) Provisional application No. 62/500,107, filed on May 2, 2017.

(51) Int. Cl.
*B25B 23/00* (2006.01)
*H01B 17/56* (2006.01)
(Continued)

(52) U.S. Cl.
CPC ......... *B25B 23/0035* (2013.01); *H01B 17/56* (2013.01); *B25B 13/06* (2013.01); *B25B 21/00* (2013.01)

(58) Field of Classification Search
CPC ..... B25B 23/0035; B25B 13/06; B25B 21/00; H01B 17/56; H02G 1/00
See application file for complete search history.

(56) References Cited

U.S. PATENT DOCUMENTS 2,025,838 A * 12/1935 Leir .......................... F16D 3/68
464/73
2,457,451 A * 12/1948 Domack ................. B23P 11/00
76/114
(Continued)

FOREIGN PATENT DOCUMENTS

| CA | 2231130 C | 2/2002 |
| CN | 101121259 A | 2/2008 |

(Continued)

OTHER PUBLICATIONS

International Search Report and Written Opinion of PCT/US2018/030603 dated Aug. 17, 2018, all enclosed pages citedherein.

(Continued)

Primary Examiner — David B. Thomas
(74) Attorney, Agent, or Firm — Burr & Forman, LLP

(57) ABSTRACT

An electrically isolated coupler may include a driven body, a drive body and an insulating member. The drive body is made of first metallic material and has a driven end configured to interface with a fastening component. The driven body includes a first interface portion and the drive body includes a second interface portion. The drive body is made of a second metallic material and has a drive end configured to interface with a driving tool. The insulating member is disposed between the drive body and the driven body to electrically isolate the drive body and the driven body from each. The first interface portion includes at least one axially extending portion that extends toward the drive body, and the second interface portion includes at least one axially extending portion that extends toward the driven body. The (Continued)

insulating member is disposed between the respective at least one axially extending portions of the first and second interface portions.

20 Claims, 9 Drawing Sheets

(51) Int. Cl.
  *B25B 21/00* (2006.01)
  *B25B 13/06* (2006.01)

(56) References Cited

U.S. PATENT DOCUMENTS

| | | | |
|---|---|---|---|
| 2,476,762 A | | 7/1949 | Petre et al. |
| 3,859,821 A | * | 1/1975 | Wallace .................... F16D 3/76 464/89 |
| 3,868,874 A | | 3/1975 | Olashaw |
| 3,873,863 A | * | 3/1975 | Pew ....................... H02K 7/145 310/50 |
| 5,485,769 A | * | 1/1996 | Olson ................... B25B 15/001 81/177.85 |
| 5,970,826 A | * | 10/1999 | Iwinski .................. B25B 13/06 81/124.6 |
| 6,029,547 A | | 2/2000 | Eggert et al. |
| 6,126,882 A | | 10/2000 | Iwinski et al. |
| 6,295,904 B1 | | 10/2001 | Webb |
| 6,962,098 B2 | | 11/2005 | Eggert et al. |
| 7,077,037 B2 | * | 7/2006 | Shevela .................. B25B 13/06 81/121.1 |
| 7,841,261 B2 | | 11/2010 | Milligan et al. |
| 7,882,769 B2 | | 2/2011 | Lin |
| 9,144,893 B2 | * | 9/2015 | Su ........................... B25B 13/56 |
| 9,827,654 B2 | * | 11/2017 | Su ........................... B25B 13/56 |
| 10,675,738 B2 | * | 6/2020 | Heitkamp ............... B25B 13/06 |
| 2008/0309444 A1 | | 12/2008 | Sorg et al. |
| 2012/0042754 A1 | | 2/2012 | Chen |
| 2012/0060656 A1 | * | 3/2012 | Chang ................. B25B 23/0035 81/438 |
| 2013/0341069 A1 | * | 12/2013 | Demaretz .............. B25B 13/56 |
| 2016/0082582 A1 | | 3/2016 | Barker |

FOREIGN PATENT DOCUMENTS

| | | |
|---|---|---|
| CN | 201963668 U | 9/2011 |
| CN | 103029088 A | 4/2013 |
| CN | 203726391 U | 7/2014 |
| CN | 204226465 U | 3/2015 |
| DE | 202018102624 U1 | 5/2018 |
| DE | 102018118335 A1 | 1/2020 |
| EP | 0747179 A1 | 12/1996 |
| EP | 0861139 A1 | 9/1998 |
| FR | 2240083 A1 | 3/1975 |
| WO | 2017106701 A1 | 6/2017 |
| WO | 2018204468 A1 | 11/2018 |

OTHER PUBLICATIONS

Office action from related Chinese application No. 201880029152.0, dated Jun. 10, 2020, all pages cited in its entirety.
International Search Report and Written Opinion of PCT/US2016/067256 dated May 17, 2017, all enclosed pages.
Chapter 1 International Preliminary Report on Patentability of PCT/US2016/067256 dated Jun. 19, 2018, all enclosed pages.
First office action from corresponding Chinese Application No. 201680081860.X dated Jun. 3, 2019, all enclosed pages.
International Search Report and Written Opinion of international application No. PCT/US2019/038668 dated Oct. 1, 2019, all enclosed pages.
European Search Report from related European Application No. 19207774.1 dated Mar. 3, 2020, all enclosed paged.
International Search Report and Written Opinion of international application No. PCT/US2020/018041 dated May 2020, all enclosed pages.
International Search Report and Written Opinion of international application No. PCT/US2020/026592 dated Jul. 2020, all enclosed pages.
Office action from, related Chinese application No. 201880029152.0, dated Jan. 4, 2021, all pages cited in its entirety.
Office action from related Mexican application No. MX/a/20201012109, dated Jan. 21, 2021, all pages cited in its entirety.

* cited by examiner

ELECTRICALLY ISOLATED COUPLING

CROSS REFERENCE TO RELATED APPLICATIONS

This application claims priority to U.S. provisional application No. 62/500,107 filed May 2, 2017, the entire contents of which are hereby incorporated by reference in its entirety.

TECHNICAL FIELD

Example embodiments generally relate to driving devices such as socket tools, bit holders and other fastener driving components. In particular, example embodiments relate to a electrically isolated coupling that can be used with such driving components to enable safe use in environments where work occurs around electrically charged components.

BACKGROUND

Socket tools, such as socket wrenches, are familiar tools for fastening nuts and other drivable components or fasteners. The sockets of these tools are generally removable heads that interface with the socket wrench on one side and interface with one of various different sizes of nut or other fastener on the other side. Because high torque is often applied through these tools, and high strength and durability is desirable, the sockets are traditionally made of a metallic material such as iron or steel. However, metallic materials can also corrode or create spark or shock hazards when used around electrically powered equipment.

Although it may be possible to coat a metallic socket in a material that is non-conductive, such material is typically not suitable for coverage of either the driving end of the socket (i.e., the end that interfaces with the wrench) or the driven end of the socket (i.e., the end that interfaces with the nut or other fastener being tightened by the socket wrench) directly contacting the driving tool or fastener. In this regard, the high torque and repeated contact with metallic components would tend to wear such materials away over time and degrade the performance of the tool. Thus, it is most likely that the ends of the socket directly contacting the driving tool or fastener would remain (or revert to) exposed metallic surfaces resulting in the socket potentially conducting electricity and becoming a shock or spark hazard.

Accordingly, a number of designs had been provided for electrical isolation of sockets. However, these designs typically apply to an individual socket. Thus, each and every different socket size and shape would need to be reproduced according to the isolation techniques employed. Existing socket sets and other driving tools for fasteners would have to be replaced, potentially at substantial cost. Moreover, many conventional isolation designs simply provide an isolation material between opposing metal portions of the drive and driven ends. This provides a weak point where the isolation material is unsupported and can fail under high torque loads.

BRIEF SUMMARY OF SOME EXAMPLES

Some example embodiments may enable the provision of a coupling device that includes a driven end and driving end that are electrically isolated. The coupling device may be used as an adaptor for driving any selected socket, bit holder, and/or the like, even if such socket/bit holder is not electrically isolated. Given that the coupling device employs electrical isolation, existing (non-electrically isolated) fastener driving components can be used in proximity to electrical components based on the isolation provided by the coupling device. Moreover, each of the driven end and the driving end may be formed of separate metallic bodies that are electrically isolated from each other, but still overlap each other (without physical contact) substantially in an axial direction. The isolation member disposed between them is therefore mutually supported by portions of both the driven end and the driving end to increase the capability of the coupling device to operate and handle very large torque loads.

In an example embodiment, an electrically isolated coupler is provided. The coupler may include a driven body, a drive body and an insulating member. The drive body is made of first metallic material and has a driven end configured to interface with a fastening component. The driven body includes a first interface portion and the drive body includes a second interface portion. The drive body is made of a second metallic material and has a drive end configured to interface with a driving tool. The insulating member is disposed between the drive body and the driven body to electrically isolate the drive body and the driven body from each. The first interface portion includes at least one axially extending portion that extends toward the drive body, and the second interface portion includes at least one axially extending portion that extends toward the driven body. The insulating member is disposed between the respective at least one axially extending portions of the first and second interface portions.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 3A:
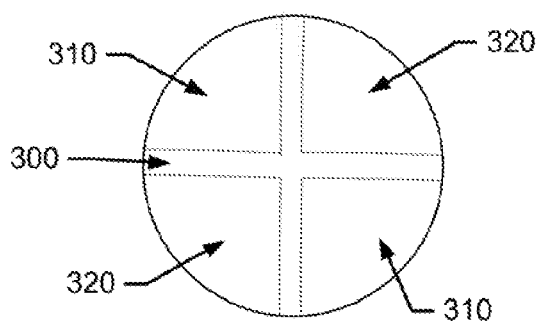
Figure 3B:
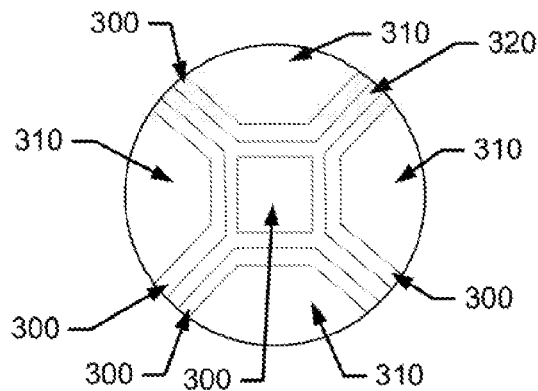
Figure 4A:
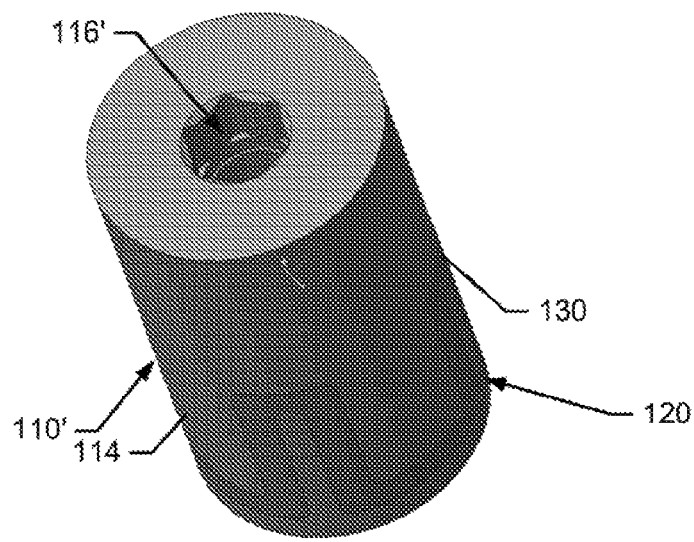
Figure 4B:
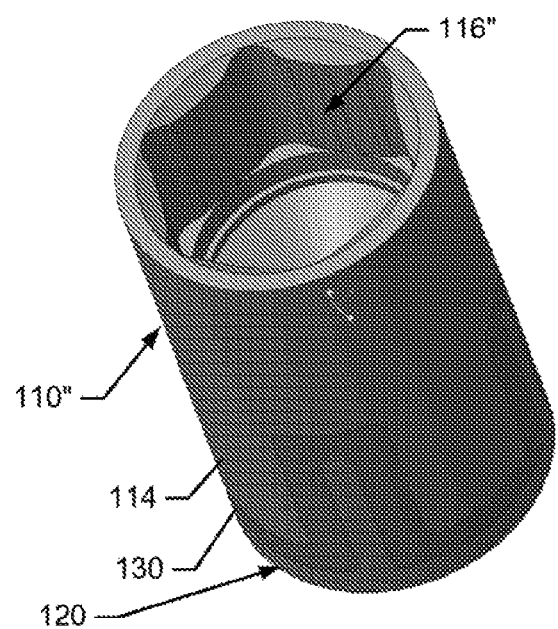
Figure 5A:
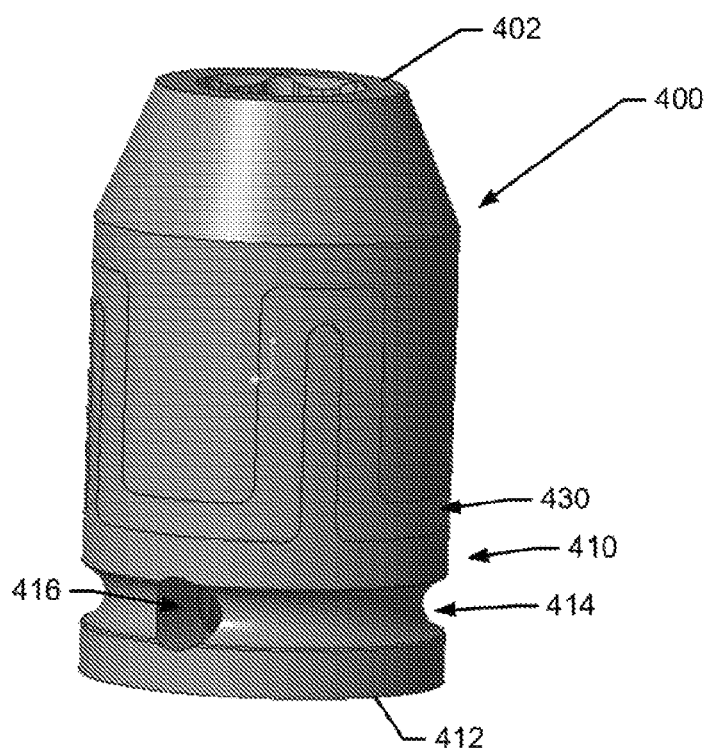
Figure 5B:
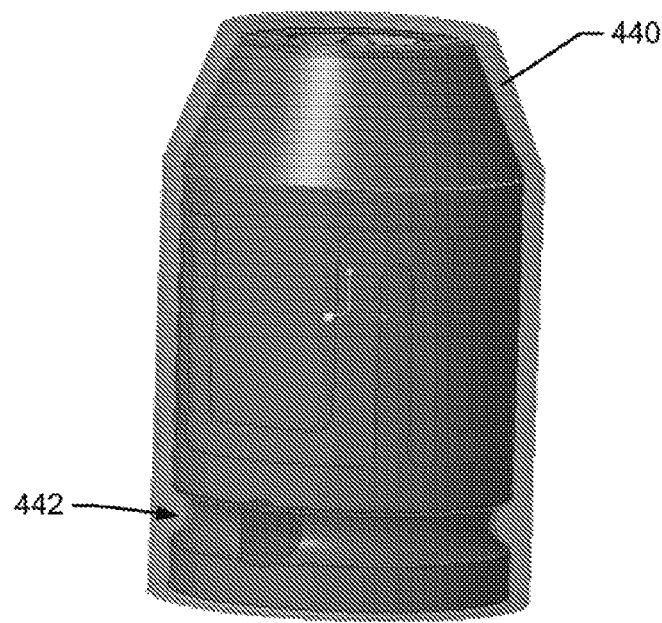
Figure 6A:
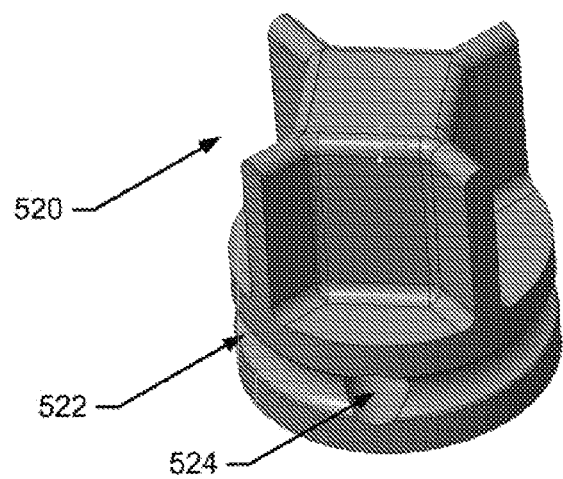
Figure 6B:
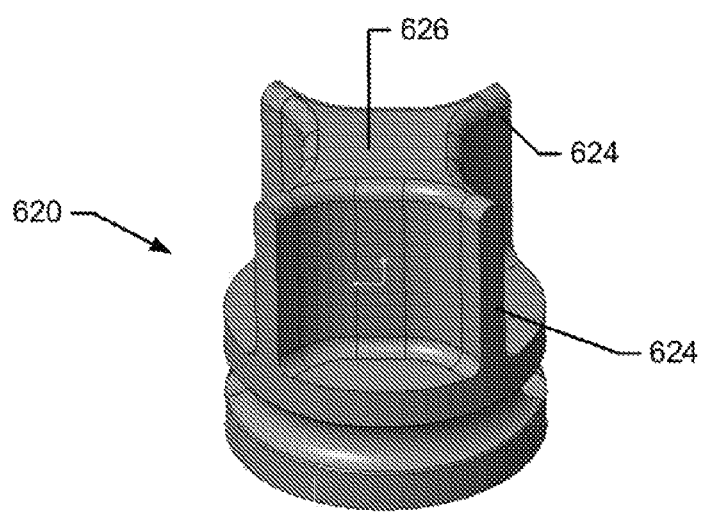
Figure 7:
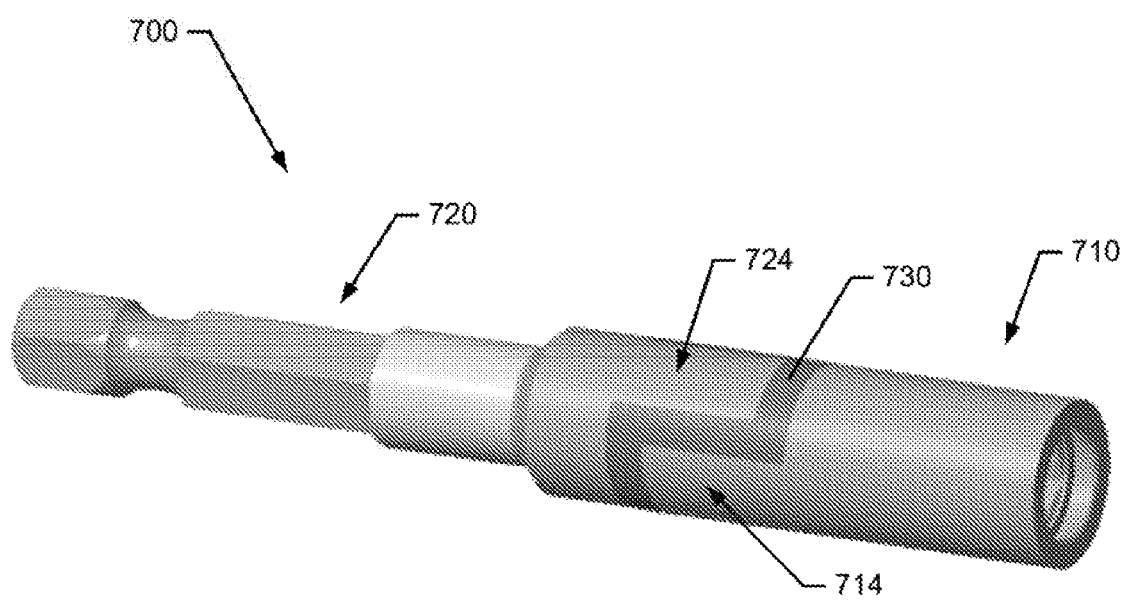
Figure 8A:
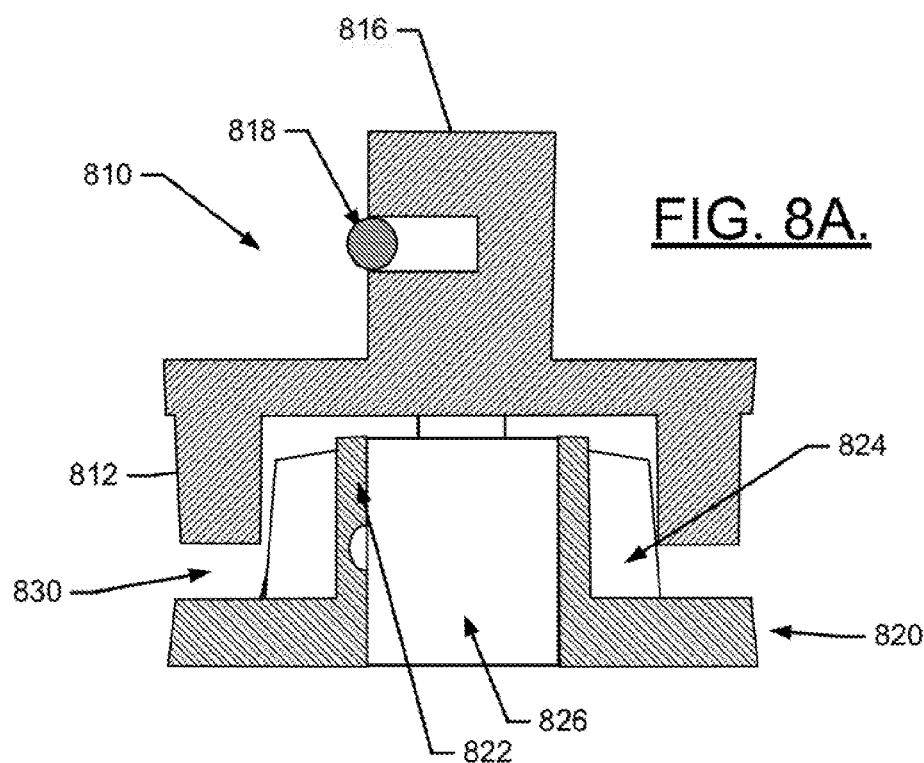
Figure 8B:
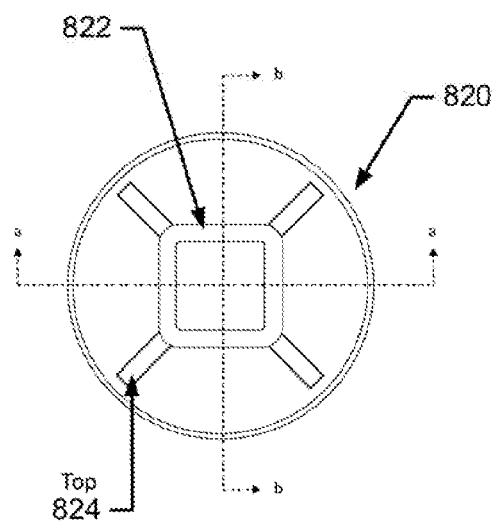
Figure 8C:
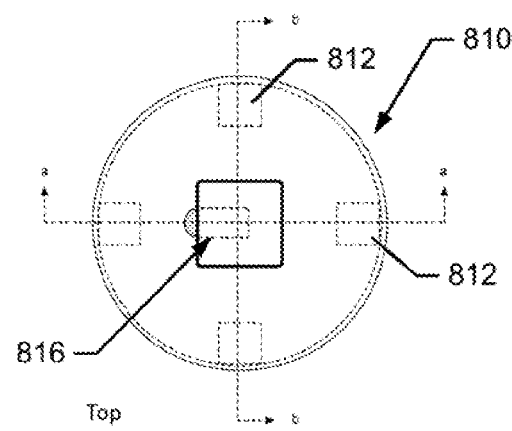
Figure 9:
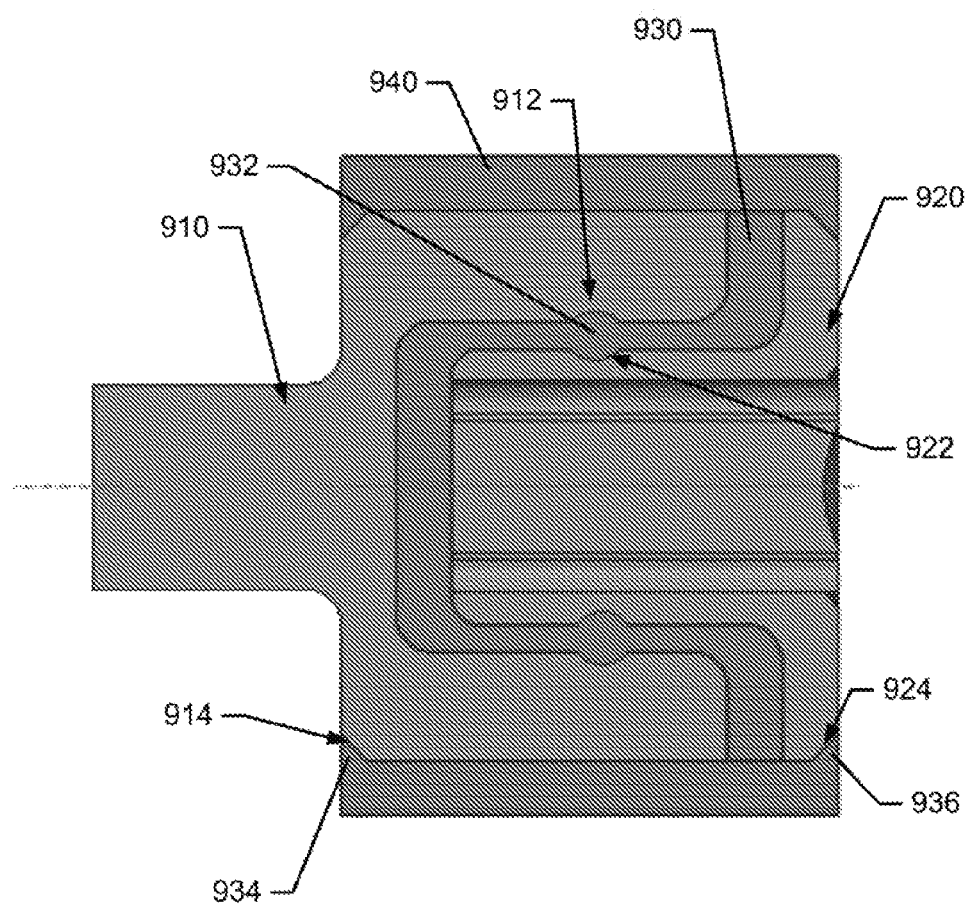

FIG. 3, which is defined by FIGS. 3A, 3B. 3C, 3D and 3E, illustrates a cross section view along the longitudinal axis of various different patterns for interface portions according to example embodiments;

FIG. 4, which is defined by FIGS. 4A and 4B, illustrates two different socket sizes that may be accommodated according to an example embodiment; and FIG. 5, which is defined by FIGS. 5A and 5B, illustrates a perspective side view of an electrically isolated coupler with some optional features according to an example embodiment;

FIG. 6, which is defined by FIGS. 6A and 6B, illustrates a perspective side view of drive bodies with alternative features according to an example embodiment;

FIG. 7 illustrates a bit holder having interface portions according to an example embodiment;

FIG. 8, which is defined by FIGS. 8A, 8B and 8C illustrates how various components can be arranged to prepare for molding of the insulating member according to an example embodiment; and FIG. 9 illustrates an example that includes structural features to prevent axial separation of components according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of electrically isolated fastener driving tools that can be used in proximity to powered components or components that have an electrical charge. In some cases, the user can safely work on or around such components or systems without having to de-energize the system. The electrical isolation provided may eliminate the risk of surge currents traveling from a fastener to a socket tool, bit driver or other fastener driving tool (such as a socket wrench or a power tool that drives sockets, bits, etc.). Particularly for power tools that include electronic components that log data about power tool usage, the isolated coupling of example embodiments can protect valuable computer data such as recorded torque information on fasteners and run-down count history for estimating power tool life.

Figure 1A:
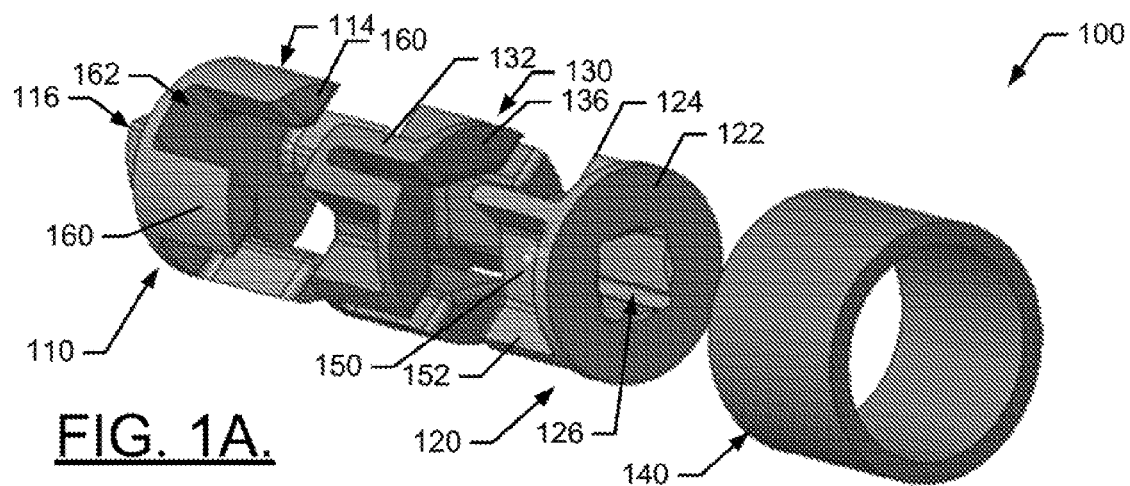
FIG. 1A is an exploded rear perspective view of an electrically isolated coupler according to an example embodiment.
Figure 1B:
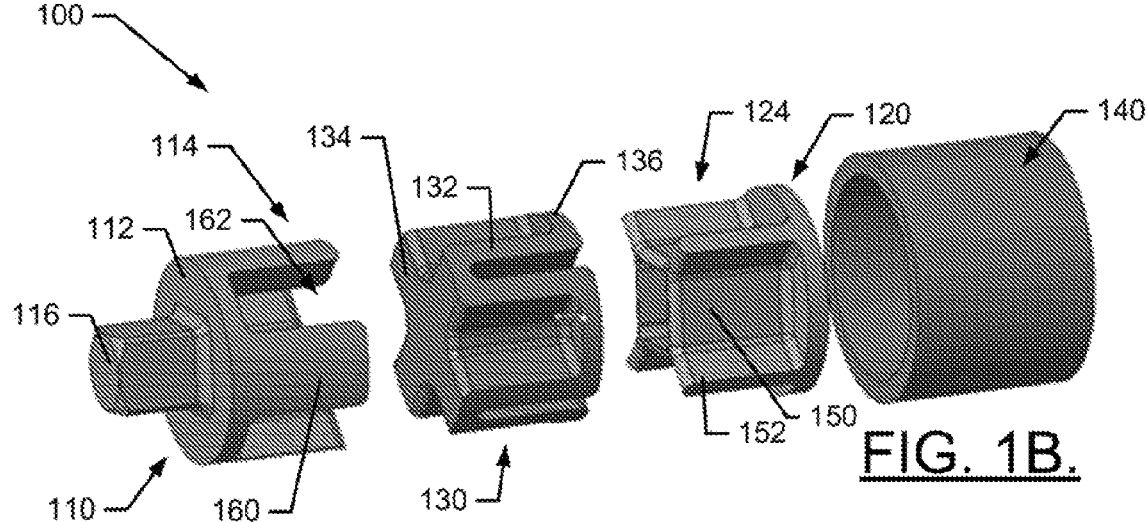
FIG. 1B is an exploded front perspective view of an electrically isolated coupler according to an example embodiment.
Figure 1C:
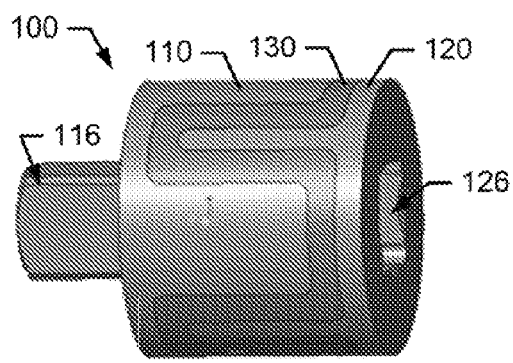
FIG. 1C is a perspective view of the electrically isolated coupler assembled with a sleeve member removed according to an example embodiment.
Figure 1D:
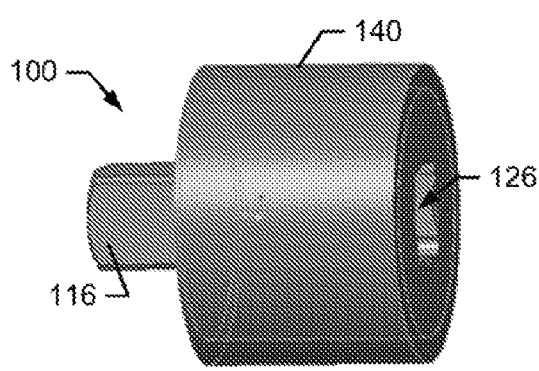
FIG. 1D shows the same perspective view of the electrically isolated coupler of FIG. 1C with the sleeve member attached according to an example embodiment.

FIG. 1, which is defined by FIGS. 1A, 1B, 1C and 1D, illustrates various perspective views of an electrically isolated coupler (or adaptor) 100 according to an example embodiment. In this regard, FIGS. 1A and 1B are exploded views from rear and front perspectives, respectively. FIG. 1C is a perspective view of the electrically isolated coupler 100 assembled with a sleeve member removed, and FIG. 1D shows the same perspective view of the electrically isolated coupler 100 with the sleeve member attached.

As shown in FIG. 1, an electrically isolated coupler 100 may include a driven body 110 and a drive body 120. The driven body 110 is referred to as "driven" because it is driven by the drive body 120 to interface with a socket, bit holder or other component that interacts with a fastener to drive the corresponding component for fastening purposes. The drive body 120 obtains the "drive" adjective because it is operably coupled to a tool that operably couples therewith to drive the electrically isolated coupler 100. The driven body 110 and drive body 120 may not contact each other, but may be oriented such that a driven end 112 of the driven body 110 and a drive end 122 of the drive body 120 face in opposite directions. Axial centerlines of each of the driven body 110 and the drive body 120 are aligned with each other and with a longitudinal centerline of the socket 100.

The driven body 110 may include an interface portion 114, which faces an interface portion 124 of the drive body 120. As such, the interface portions 114 and 124 may be proximate to each other, but spaced apart from each other. The interface portions 114 and 124 may be considered to be "proximal ends" of the driven body 110 and drive body 120, respectively, since they are proximate to each other. The driven end 112 and the drive end 122 may therefore be considered to be "distal ends" since that are distally located relative to each other.

In an example embodiment, both the driven body 110 and the drive body 120 may be made of metallic material (e.g., stainless steel, or other rigid and durable alloys). By making the driven body 110 and drive body 120 of metallic material (e.g., the same or different metals), the driven body 110 and drive body 120 may each be very durable and able to withstand large amounts of force, torque and/or impact. However, in order to provide insulation between the driven body 110 and the drive body 120, a non-metallic and insulating material (e.g., insulating member 130) may be inserted therebetween to render the driven body 110 and drive body 120 electrically isolated from each other. Thus, although the advantages of using metallic material are provided with respect to the interfacing portions of the electrically isolated coupler 100, the disadvantages relative to use in proximity to electrically powered or charged components may be avoided.

In some embodiments, a sleeve 140 may be provided to extend around the radial edges of the driven body 110 and the drive body 120. The sleeve 140 may be generally cylindrical in shape, and may be made of substantially the same material as the insulating member 130. Moreover, although the insulating member 130 and the sleeve 140 could be separate components, in some cases, the insulating member 130 and the sleeve 140 could be integrally formed with each other. In such an example, the insulating member 130 and the sleeve 140 may be formed by molding.

In this regard, for example, the interface portion 114 of the driven body 110 may be provided spaced apart from the interface portion 124 of the drive body 120 and the insulating member 130 may be molded therebetween. In some cases, the molding process itself may substantially hold the interface portion 114 of the driven body 110 and the interface portion 124 of the drive body 120 together. However, in other examples, structural features may be provided on the interface portion 114 of the driven body 110 and/or the interface portion 124 of the drive body 120 to further facilitate retention of the entire assembly in contact with each other. When the sleeve 140 is also molded (or over-molded) with the insulating member 130, the sleeve 140 may further facilitate holding the entire assembly together. Although ends (e.g., the driven end 112 and the drive end 122) could be over-molded as well in some cases, in other examples metal may be exposed at both the driven end 112 and the drive end 122. Moreover, in some cases, the sleeve 140 may extend along the sides of the driven body 110 and the drive body 120 to be flush with the driven end 112 and the drive end 122, respectively.

In an example embodiment, the insulating member 130 and/or the sleeve 140 may be formed from a high strength molding compound, which may be glass-fiber reinforced and/or a plastic composite material. The insulating member 130 and/or the sleeve 140 may have a relatively small thickness to avoid excessive increases in the size of the electrically isolated coupler 100. In this regard, for example, thicknesses could range from 1/32 of an inch to 1/4 of an inch, with actual thicknesses being determined based on the actual intended uses of the electrically isolated coupler 100.

In the example of FIG. 1, the diameter of both the driven body 110 and the drive body 120 are substantially equal, and this may be the case in most situation. However, the diameters of each could be different in some cases. In such a case, the insulating member 130 and/or the sleeve 140 may be molded to accommodate for a smooth transition between the different diameters. In cases in which the driven body 110 and the drive body 120 have substantially similar diameters, the diameter of the insulating member 130 may also be substantially equal to the diameters of each of the driven body 110 and the drive body 120.

A driven mating structure 116 may be provided on the driven end 112 to interface with a socket, bit holder or other fastener driving device. Meanwhile, a drive mating structure 126 may be provided at the drive end 122. In the example of FIG. 1, the driven mating structure 116 is a male driving projection, and the drive mating structure 126 is a female drive opening configured to receive a male driving projection (e.g., similar to the male driving projection of the driven mating structure 116). Thus, the driven mating structure 116 effectively simply allows a conventional socket wrench to be used with a conventional socket while providing insulation properties to enable the combination to be used proximate to electronic circuitry.

The sizes and shapes of the driven mating structure 116 and the drive mating structure 126 may vary in different embodiments. Moreover, such components may be interchangeable with each other via being configured to have common interface portions (114 and 124). Thus, for example, the drive side or the driven side could be changed to accommodate 3/8 inch, 1/4 inch, 1/2 inch, and/or various other desirable sizes and configurations for the driven mating structure 116 and the drive mating structure 126.

In an example embodiment, the interface portion 114 of the driven body 110 and the interface portion 124 of the drive body 120 may take various different forms. In the example of FIGS. 1A and 1B, the interface portion 124 of the drive body 120 includes a base portion 150 and four wing portions 152 to define a pattern. The wing portions 152 extend radially away from corners of the base portion 150, as the base portion is generally square shaped (e.g., to match the shape of the drive mating structure 126). Both the base portion 150 and the wing portions 152 also extend in the axial direction away from the drive end 122.

The interface portion 114 of the driven body 110 includes four protruding members 160 that are evenly spaced apart to form receiving slots 162 therebetween. The protruding members 160 generally correspond to the areas between the wing portions 152, and the receiving slots 162 generally correspond to the wing portions 152 themselves. However, the protruding members 160 are not shaped to mate directly with the base portion 150 and/or the wing portions 152. In other words, the protruding members 160 and receiving slots 162 do not match and therefore do not mate with the pattern formed by the base portion 150 and the wing portions 152. Instead, the interface portion 114 of the driven body 110 and the interface portion 124 of the drive body 120 are each formed to interface with respective opposing sides of the insulating member 130, which matches the pattern of the base portion 150 and the wing portions 152, and also fits tightly into the receiving slots 162 between the protruding members 160 of the driven body 160.

Accordingly, the insulating member 130 is formed to substantially match the pattern formed by the base portion 150 and wing portions 152 in order to mate therewith. In this example, the insulating member 130 includes axially extending portions 132 that separate the base portion 150 and wing portions 152 from each other along their parallel extending faces that extend in the axial direction. The insulating member 130 also includes radially extending portions 134 and 136 that generally extend in a radial direction to separate parallel faces of distal ends of the protruding members 160 from corresponding portions of the drive body 120 and separate parallel faces of distal ends of the base portion 150 and the wing portions 152 from corresponding portions of the driven body 110.

As can be appreciated from FIG. 1, the insulating member 130 separates the interface portion 114 of the driven body 110 and the interface portion 124 of the drive body 120 from each other in both radial and axial directions to provide a complete electrical isolation therebetween. However, the insulating member 130 is also provided between axially extending faces of each of the interface portion 114 of the driven body 110 and the interface portion 124 of the drive body 120 to allow such faces to apply torque to both sides of the insulating member 130 between such faces. Accordingly, there is no axially extending portion of the insulating member 130 that is not supported on opposing sides thereof by respective ones of the interface portion 114 of the driven body 110 and the interface portion 124 of the drive body 120. Additionally, there is no cross section of the electrically isolated coupler 100 that could be taken anywhere along the axial length of the electrically isolated coupler 100 that would include only the material of the insulating member 130. As such, no weak point exists at which the material of the insulating member 130 alone could fail to damage or destroy the electrically isolated coupler 100. The strength of the electrically isolated coupler 100 is therefore not compromised, while full electrical isolation is still provided.

The design of FIG. 1 provides a relatively compact length for the electrically isolated coupler 100, since the base portion 150, which forms the drive mating structure 126 is actually incorporated into interface portion 124 of the drive body 120. However, it is also possible to separate the drive mating structure 126 from the interface portion 124 by altering the design somewhat. Similarly, different specific structures could be used for the interface portions. FIG. 2 illustrates such an example that makes both of these modifications.

Figure 2A:
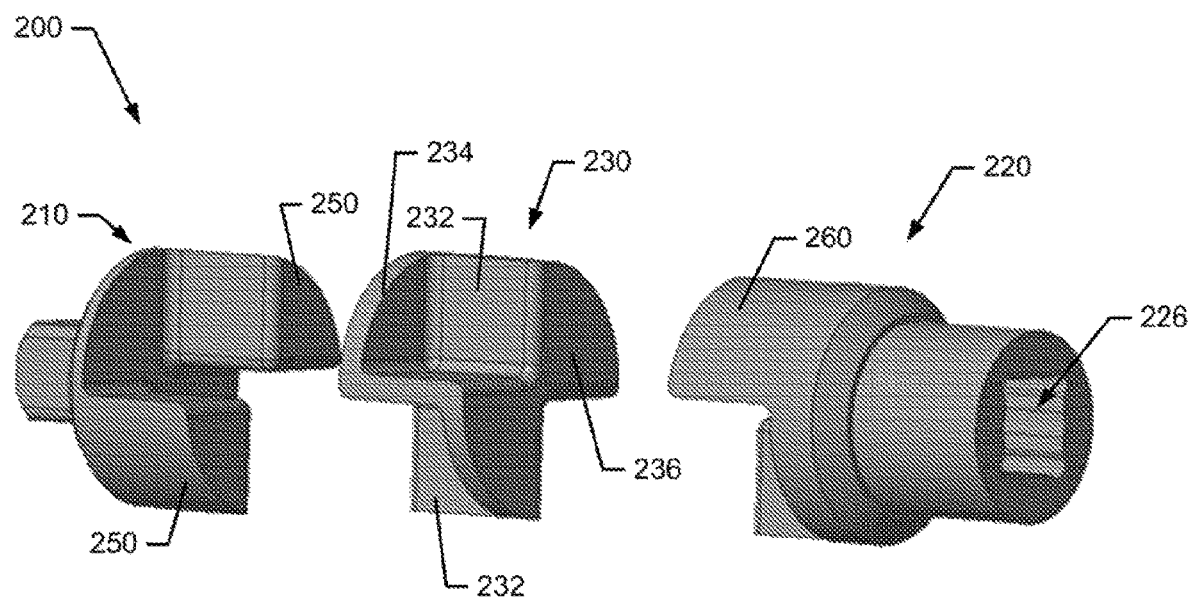
FIG. 2A is an exploded perspective view of an alternative assembled structure of an electrically isolated coupler according to an example embodiment.
Figure 2B:
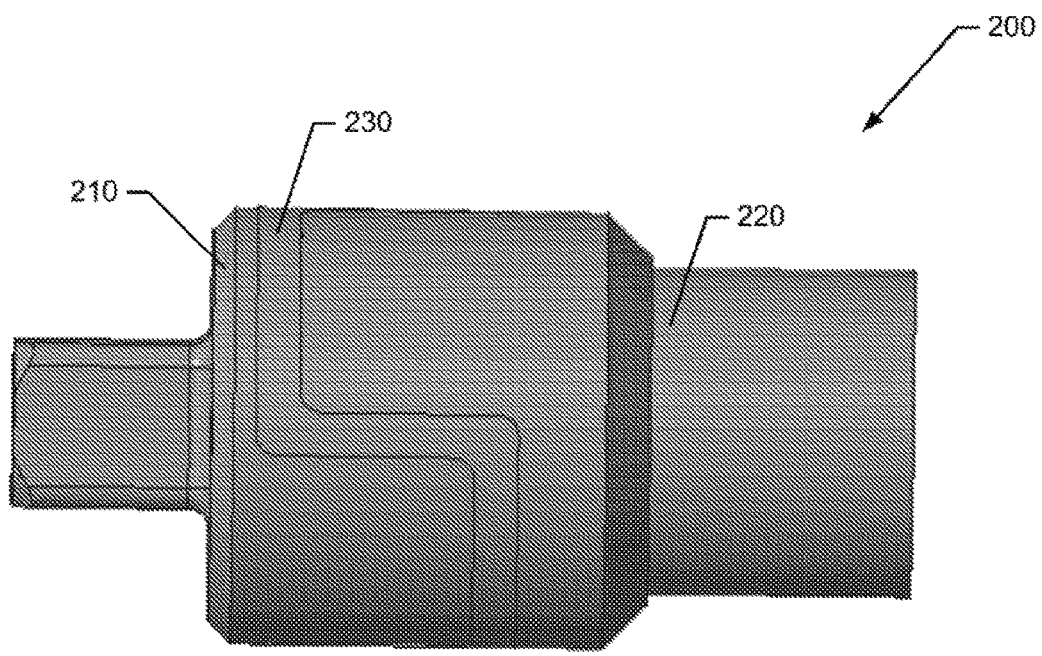
FIG. 2B is an assembled side view of the electrically isolated coupler of FIG. 2A according to an example embodiment.

FIG. 2, which is defined by FIGS. 2A and 2B, shows an alternative design for an electrically isolated coupler 200. FIG. 2A is an exploded perspective view, and FIG. 2B is a side view of the assembled structure of FIG. 2A. As shown in FIG. 2, the electrically isolated coupler 200 may include a driven body 210 and a drive body 220. The driven body 210 and drive body 220 do not contact each other due to the presence of insulating member 230 therebetween. The insulating member 230 fits between an interface portion 214 of the driven body 210 and an interface portion 224 of the drive body 220.

As can be seen in FIG. 2, a drive mating structure 226 of the drive body 220 is provided at a separate axially extended portion of the drive body 220 from the interface portion 224. Although the overall length of the electrically isolated coupler 200 may be increased due to this design, it should be noted that the removal of the drive mating structure 226 from the interface portion 224 creates the opportunity for increased design flexibility relative to the structure of the interface portion 224 and the insulating member 230.

In the example of FIG. 2, the interface portion 214 of the driven body 210 and the interface portion 224 of the drive body 220 substantially mirror each other. In this regard, the interface portion 214 of the driven body 210 is defined by protruding members 250 that are substantially shaped as two axially extending quarter circles in opposite quadrants. Meanwhile, the interface portion 224 of the drive body 220 is also defined by protruding members 260 that are substantially shaped as two axially extending quarter circles in opposite quadrants. Moreover, the protruding members 250 of the interface portion 214 of the driven body 210 are in opposing quadrants relative to the protruding members 260 of the interface portion 224 of the drive body 220.

As in the prior example, the insulating member 230 separates the interface portion 214 of the driven body 210 and the interface portion 224 of the drive body 220 from each other in both radial and axial directions to provide a complete electrical isolation therebetween. However, the insulating member 230 is also provided between axially extending faces of each of the interface portion 214 of the driven body 210 and the interface portion 224 of the drive body 220 to allow such faces to apply torque to both sides of the insulating member 230 between such faces. Accordingly, there is again no axially extending portion of the insulating member 230 that is not supported on opposing sides thereof by respective ones of the interface portion 214 of the driven body 210 and the interface portion 224 of the drive body 220. Additionally, there is no cross section of the electrically isolated coupler 200 that could be taken anywhere along the axial length of the electrically isolated coupler 200 that would include only the material of the insulating member 230. As such, no weak point exists at which the material of the insulating member 230 alone could fail to damage or destroy the electrically isolated coupler 200.

In the example of FIG. 2, the insulating member 230 includes axially extending portions 232 that separate the protruding members 250 and 260 from each other along their parallel extending faces that extend in the axial direction. The insulating member 230 also includes radially extending portions 234 and 236 that generally extend in a radial direction to separate parallel faces of distal ends of the protruding members 250 and 260 from corresponding portions of the drive body 220 and the driven body 210, respectively.

Figure 3C:
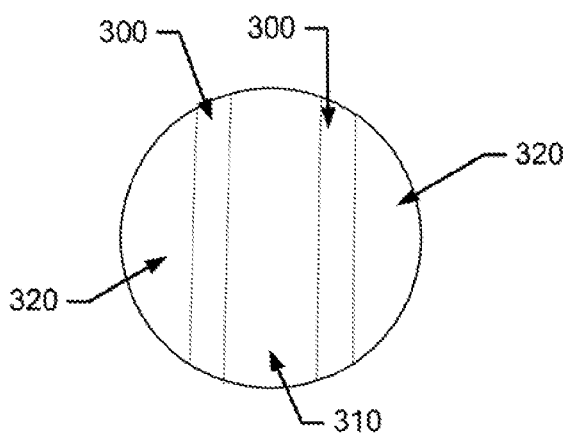
Figure 3D:
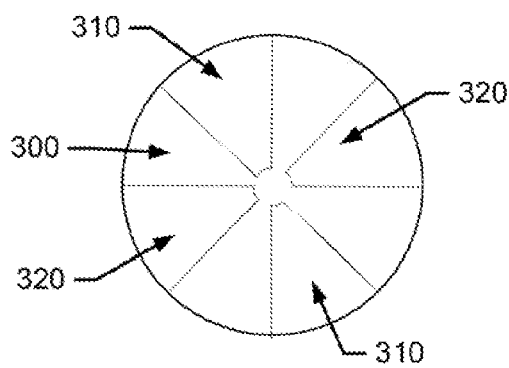
Figure 3E:
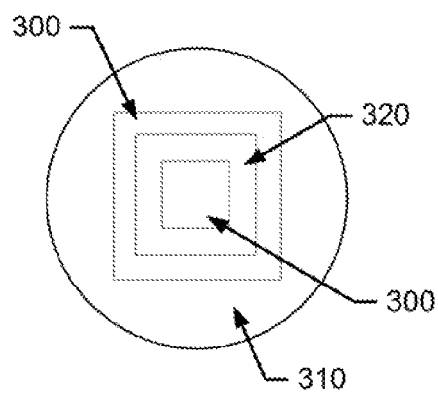

A number of different designs may be included for the insulating member, but all such designs would generally provide that any cross section through the axially extending portions of the insulating member would include portions of both the interface portion of the driven body and the interface portion of the drive body on opposing sides thereof. FIG. 3, which is defined by FIGS. 3A, 3B, 3C, 3D and 3E, includes some examples. In this regard, FIGS. 3A and 3B illustrates examples in which the drive mating structure is part of the interface portion, and FIGS. 3C, 3D and 3E illustrate examples in which the drive mating structure is not incorporated as a part of the interface portion.

In FIG. 3, portions of the cross sectional views that correlate to the insulating member are labeled as insulating material 300. Portions that correspond to the driven body are labeled as driven body material 310, and portions that correspond to the drive body are labeled as drive body material 320. As can be seen from FIG. 3, various patterns may be achieved for the interface portions and for the insulating member. However, as described above, overlapping portions of the interface portions that extend along the axial direction of the isolated coupling are always separated by the insulating member. Of note, the design of FIG. 3A generally corresponds to a cross section of the electrically isolated coupler 200 of FIG. 2 and the design of FIG. 3B generally corresponds to a cross section of the electrically isolated coupler 100 of FIG. 1.

Although the examples of FIGS. 1 and 2 generally correspond to an electrically isolated coupler that acts as an adapter to receive a male drive square at one end (i.e., the drive end) and convert to an isolated male drive square at the other end (i.e., at the driven end), other structures are also possible. In this regard, for example, the driven body 110 could be replaced with an alternate driven body 110' that has a driven mating structure 116' formed as a socket of any desirable size as shown in FIG. 3A. The alternate driven body 110' may have the same interface portion (i.e., interface portion 114) that is shown in the example of FIG. 1. Thus, the drive body 120 and the insulating member 130 may also be the same as the example of FIG. 1.

In some cases, alternative socket sizes (e.g., like driven mating structure 116") could be provided with a corresponding different driven body 110". The different driven body 110" may also have the same interface portion (i.e., interface portion 114) that is shown in the example of FIG. 1. Thus, the drive body 120 and the insulating member 130 of the example of FIG. 1 may also be used with the different driven body 110" and any of a number of other possible driven body structures Of course, the drive body 120 could also be substituted for other structures.

FIG. 5, which is defined by FIGS. 5A and 5B, shows an example with the same interface portions as shown in FIG. 1, but the drive body and driven body each include other modifications. For example, in FIG. 5A, the driven body 400 tapers toward the driven end 402, meanwhile the drive body 410 includes an annular groove 414 disposed proximate to the drive end 412. The annular groove 414 may further include a through-hole 416 to receive a ball disposed at a side portion of a male drive interface. However, the interface portions (114 and 124) may otherwise be the same as shown in the example of FIG. 1 (or any other example). Thus, the insulating member 430 may also be the same as the insulating member 130 of the example of FIG. 1.

A sleeve 440 may be molded around the entire assembly as shown in FIG. 5B. Although the sleeve 440 could be molded together with the insulating member 430 as described above, some embodiments may alternatively form the sleeve 430 as a freely rotating cover. For example, the sleeve 440 could be molded as a separate component that can be slid over the drive body 410 and the driven body 400 and held in place by an annular projection 442 that may project into the annular groove 414. The annular projection 442 and the annular groove 414 may generally prevent axial movement of the sleeve 440 while fully permitting rotation of the sleeve 440.

FIG. 6, which is defined by FIGS. 6A and 6B, includes two other modifications. In this regard, the drive body 520 of FIG. 6A includes an annular groove 522 and through-hole 524, but is otherwise similar to the drive body 120 of FIG. 1. The drive body 620 of FIG. 6B is similar to that of FIG. 6A except that rounded transitions are provided between the wing portions 624 and the base portion 626.

Referring to FIG. 7, a bit holder 700 is shown having a driven body 710 and a drive body 720 that are separated from each other by an insulating member 730. Although the driven body 710 includes a socket in this example, and the drive body 720 includes a hex portion for engaging a chuck of a drill or another driving structure, the interface portions 714 and 724 are otherwise similar to the example of FIG. 2.

Thus, other than differences in diameter, the insulating member 730 may otherwise be similar to the insulating member 230 of the example of FIG. 2. Other patterns for the interface portions may also be employed such as, for example, those shown in FIG. 3.

FIG. 8, which is defined by FIGS. 8A, 8B and 8C illustrates how various components can be arranged to prepare for molding of the insulating member. In this regard, FIG. 8B illustrates a top view of the interface portion of a drive body 820 according an example embodiment. The drive body 820 includes radial wings 824 extending away from a base portion 822 that is built around the drive mating structure 826. FIG. 8C illustrates a to view of a driven end of a driven body 810 according to an example embodiment. In FIG. 8C, components of the interface portion of the driven body 810 (i.e., protrusions 812) are shown as dashed squares since they project in the direction into the page for this view. The driven body 810 may further include a driven mating structure 816 including a ball 818 that is outwardly biased.

The protrusions 812 may be provided into spaces between the radial wings 824 while the drive body 820 and driven body 810 are axially aligned. A gap 830 may be formed between the drive body 820 and driven body 810 after they area axially aligned. Thereafter, insulating material may be molded into the gap 830 to define the insulating member.

As discussed above, the molding process may work to axially bind the drive body and the driven body. However, in some cases, structural features may be provided on the interface portions of either or both of the driven body and the drive body to further facilitate retention of the entire assembly in contact with each other. FIG. 9 illustrates an example that includes such structural features, showing a cross section taken along the longitudinal axis.

As shown in FIG. 9, a drive body 920 and driven body 910 may be separated from each other by an insulating member 930 in the manner generally described above. However, the interface portion of the driven body 910 may include at least one recessed portion 912 (e.g., a groove or void space). Additionally or alternatively, the interface portion of the drive body 920 may include at least one recessed portion 922. Each recessed portion 912 and 922 may be filled with insulating material during the molding of the insulating member 930. Although not required, the recessed portions 912 and 922 may be positioned to correspond to each other to create an annular binding portion 932 if both such recessed portions are annular in shape themselves. The binding portion 932 may resist separation forces that may try to separate the drive body 920 and driven body 910 axially.

Alternatively or additionally, a sleeve 940 formed over the drive body 920 and the driven body 910 after assembly may also include binding features. In this regard, for example, the drive body 920 may be beveled to provide a feature (e.g., beveled edge 924) that, when the sleeve 940 is over-molded onto the drive body 920, provides an overlap portion 936 to engage the beveled edge 924 to prevent movement of the drive body 920 away from the driven body 910. Likewise, the driven body 910 may be beveled to provide a feature (e.g., beveled edge 914) that, when the sleeve 940 is over-molded onto the driven body 910, provides an overlap portion 934 to engage the beveled edge 914 to prevent movement of the driven body 910 away from the drive body 920.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An electrically isolated coupler comprising:
   a driven body made of first metallic material and having a driven end configured to interface with a fastening component, the driven body comprising a first interface portion;
   a drive body made of a second metallic material and having a drive end configured to interface with a driving tool, the drive body comprising a second interface portion; and
   an insulating member disposed between the drive body and the driven body to electrically isolate the drive body and the driven body from each other,
   wherein the first interface portion includes at least one axially extending portion that extends toward the drive body, and the second interface portion includes at least one axially extending portion that extends toward the driven body,
   wherein the insulating member is disposed between the respective at least one axially extending portions of the first and second interface portions,
   wherein a sleeve is disposed around radial edges of the drive body, the driven body and the insulating member, and
   wherein the sleeve is rotatable relative to the drive body and the driven body.

2. The electrically isolated coupler of claim 1, wherein the sleeve comprises an overlap portion disposed to engage a beveled edge provided on the drive body or the driven body to prevent axial separation of the drive body from the driven body.

3. The electrically isolated coupler of claim 1, wherein the sleeve includes an inwardly facing annular projection, and the drive body includes an annular groove, the annular projection being operably coupled to the annular groove to enable the sleeve to rotate relative to the drive body and the driven body.

4. The electrically isolated coupler of claim 1, wherein the driven body is tapered toward a driven end of the driven body.

5. The electrically isolated coupler of claim 1, wherein the driven body comprises a socket of a predetermined size.

6. The electrically isolated coupler of claim 1, wherein the drive body further comprises an annular groove disposed proximate to the drive end.

7. The electrically isolated coupler of claim 6, wherein the annular groove includes a through-hole.

8. The electrically isolated coupler of claim 1, wherein the electrically isolated coupler comprises a bit holder.

9. The electrically isolated coupler of claim 1, wherein the drive body defines a pattern and the insulating member is molded to fit the pattern between the drive body and corresponding axially extending portions of the driven body.

10. The electrically isolated coupler of claim 1, wherein the second interface portion extends at least partially around a drive mating structure of the drive body.

11. An electrically isolated coupler comprising:
a driven body made of first metallic material and having a driven end configured to interface with a fastening component, the driven body comprising a first interface portion;
a drive body made of a second metallic material and having a drive end configured to interface with a driving tool, the drive body comprising a second interface portion; and
an insulating member disposed between the drive body and the driven body to electrically isolate the drive body and the driven body from each other,
wherein the first interface portion includes at least one axially extending portion that extends toward the drive body, and the second interface portion includes at least one axially extending portion that extends toward the driven body,
wherein the insulating member is disposed between the respective at least one axially extending portions of the first and second interface portions,
wherein the insulating member comprises a binding portion disposed to extend into a portion of the drive body or the driven body to prevent axial separation of the drive body from the driven body, and
wherein binding portion has an annular shape due to the provision of an annular groove at the first interface portion or the second interface portion.

12. The electrically isolated coupler of claim 11, wherein the second interface portion extends at least partially around a drive mating structure of the drive body.

13. An electrically isolated coupler comprising:
a driven body made of first metallic material and having a driven end configured to interface with a fastening component, the driven body comprising a first interface portion;
a drive body made of a second metallic material and having a drive end configured to interface with a driving tool, the drive body comprising a second interface portion; and
an insulating member disposed between the drive body and the driven body to electrically isolate the drive body and the driven body from each other,
wherein the first interface portion includes at least one axially extending portion that extends toward the drive body, and the second interface portion includes at least one axially extending portion that extends toward the driven body, and
wherein the insulating member is disposed between the respective at least one axially extending portions of the first and second interface portions,
wherein the drive body defines a pattern and the insulating member is configured to fit the pattern between the drive body and corresponding axially extending portions of the driven body, and
wherein a sleeve is disposed to be rotatable relative to the drive body and the driven body.

14. The electrically isolated coupler of claim 13, wherein a driven mating structure is disposed at the driven end to interface with a socket, bit holder or other fastener driving device.

15. The electrically isolated coupler of claim 14, wherein the driven mating structure comprises a male driving projection.

16. The electrically isolated coupler of claim 15, wherein a drive mating structure is disposed at the drive end.

17. The electrically isolated coupler of claim 16, wherein the drive mating structure is a female drive opening configured to receive a projection having a shape similar to the male driving projection.

18. The electrically isolated coupler of claim 13, wherein the insulating member comprises one or more axially extending portions that separate the axially extending portions of the driven body from the axially extending portions of the drive body.

19. The electrically isolated coupler of claim 13, wherein the insulating member further comprises radially extending portions at opposing axial ends of the insulating member, the radially extending portions separating parallel faces of a distal end of the axially extending portions of the driven body and the drive body from corresponding portions of the drive body the driven body, respectively.

20. The electrically isolated coupler of claim 13, wherein the sleeve is disposed around radial edges of the drive body, the driven body and the insulating member.

* * * * *